UNITED STATES PATENT OFFICE.

HENRI E. BISSELL, OF HARTFORD, CONNECTICUT.

IMPROVEMENT IN REMEDIES FOR CATARRH.

Specification forming part of Letters Patent No. 220,794, dated October 21, 1879; application filed August 4, 1879.

*To all whom it may concern:*

Be it known that I, HENRI E. BISSELL, of Hartford, in the county of Hartford and State of Connecticut, have invented certain new and useful Improvements in Chemical Compounds for the Cure of Catarrh, of which the following is a specification.

My invention relates to an improved mixture or remedy for the treatment of catarrh; and it consists in the combination of suitable proportions of tribasic phosphate of soda, bicarbonate of soda, and sugar of milk.

In the preparation of my improved compound I vary the relative proportions of the ingredients to adapt the medicine to the nature of the disease.

For a medicine to be used in very severe cases of catarrh about the following proportions should be used: tribasic phosphate of soda, eight ounces; bicarbonate of soda, four ounces; sugar of milk, two ounces.

In mild forms of the disease the following formula will be found efficient: tribasic phosphate of soda, six ounces; bicarbonate of soda, two ounces; sugar of milk, four ounces.

The several ingredients should be ground or pulverized and thoroughly mixed together, and kept after preparation in air-tight bottles. After mixing I preferably bolt the compound to get a fine powder.

The powder may be administered by snuffing through the nostrils, the dose being about ten to twenty grains for adults, to be taken, say, three times a day, especially on retiring at night, the dose to be varied according to the character of the case, and also according to the age of the person, a less dose being suitable for children.

The medicine may also be used very advantageously in solution by dissolving, say, ten to twenty grains, by weight, of the powder in one hundred drops of distilled water mixed with five drops of alcohol. This solution may be administered in the form of spray by means of an atomizer, or it may be applied as a douche.

The solution above indicated is appropriate for adults, the proportion of the powder ranging from ten to twenty grains, according to the severity of the case and age of the person.

I do not limit myself to any particular proportions of the several ingredients, as they may be greatly varied without departing from the essential principle of my invention.

It will be understood that I have in this specification referred to the medicinal or tribasic phosphate of soda.

Having thus described my invention, what I claim is—

The improved catarrh remedy consisting of a mixture of tribasic phosphate of soda, bicarbonate of soda, and sugar of milk, substantially as set forth.

In testimony that I claim the foregoing I have hereunto set my hand in the presence of the subscribing witnesses.

HENRI E. BISSELL.

Witnesses:
W. M. BEEMAN,
V. D. PERRY.